(12) United States Patent
Yi et al.

(10) Patent No.: US 11,526,039 B2
(45) Date of Patent: Dec. 13, 2022

(54) DISPLAY DEVICE AND METHOD OF FABRICATING THE SAME

(71) Applicant: Samsung Display Co., Ltd., Yongin-si (KR)

(72) Inventors: Kang Bin Yi, Yongin-si (KR); Dong Rak Ko, Asan-si (KR); Sung Ho Kim, Asan-si (KR); Eun Ji Seo, Asan-si (KR); Sung Hun Son, Cheonan-si (KR); Hee Kyun Shin, Incheon (KR); Seok Lyul Yoon, Hwaseong-si (KR); Jeong Seok Lee, Osan-si (KR); Sung Wook Jung, Seoul (KR); Hwan Kyeong Jeong, Cheongju-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/750,509

(22) Filed: May 23, 2022

(65) Prior Publication Data
US 2022/0283454 A1 Sep. 8, 2022

Related U.S. Application Data

(60) Continuation of application No. 17/208,372, filed on Mar. 22, 2021, now Pat. No. 11,340,483, which is a (Continued)

(30) Foreign Application Priority Data

May 3, 2016 (KR) .................. 10-2016-0054763

(51) Int. Cl.
*G02F 1/1333* (2006.01)
*B24B 7/24* (2006.01)
*G02F 1/133* (2006.01)

(52) U.S. Cl.
CPC .............. *G02F 1/1333* (2013.01); *B24B 7/24* (2013.01); *G02F 1/13318* (2013.01); *G02F 1/133302* (2021.01); *G02F 1/133311* (2021.01)

(58) Field of Classification Search
CPC .................................................. G02F 1/133302
See application file for complete search history.

(56) References Cited

U.S. PATENT DOCUMENTS 6,025,901 A 2/2000 Adachi et al.
2004/0248017 A1* 12/2004 Ohtaguro ................ C03C 19/00
430/5

(Continued)

FOREIGN PATENT DOCUMENTS

CN 101013707 8/2007
KR 1020100080048 7/2010

(Continued)

OTHER PUBLICATIONS

Korean Office Action—Korean Application No. 10-2016-0054763 dated Jun. 16, 2022, citing references listed within.

*Primary Examiner* — Alexander P Gross
(74) *Attorney, Agent, or Firm* — Cantor Colburn LLP (57) ABSTRACT

A display device includes first and second substrates each including a short side and a long side, ground parts located on at least one of the short and long sides of each of the first and second substrates and including at least one first ground surfaces, which are perpendicular to opposing surfaces of the first and second substrates, and at least one second ground surfaces, which are provided at at least one edge of the second substrate to define an obtuse angle with reference to the first ground surfaces, and unevenness disposed on the first ground surfaces along a first direction, where the unevenness defines an acute angle with reference to a normal line to the opposing surfaces.

11 Claims, 7 Drawing Sheets

Related U.S. Application Data continuation of application No. 16/775,002, filed on Jan. 28, 2020, now Pat. No. 10,955,693, which is a division of application No. 15/584,975, filed on May 2, 2017, now Pat. No. 10,591,759.

(56) References Cited

U.S. PATENT DOCUMENTS

| | | |
|---|---|---|
| 2007/0177092 A1 | 8/2007 | Hosoya |
| 2011/0129648 A1 | 6/2011 | Gu |
| 2012/0135181 A1* | 5/2012 | Tseng ................. B24B 9/065 428/81 |
| 2013/0182199 A1 | 7/2013 | Hosoya |
| 2014/0065376 A1* | 3/2014 | Venkatachalam ....... B24B 7/242 428/192 |
| 2014/0333882 A1 | 11/2014 | Hosoya |
| 2015/0029449 A1 | 1/2015 | Woo et al. |
| 2017/0304980 A1* | 10/2017 | Jotz .................. C03C 3/118 |

FOREIGN PATENT DOCUMENTS

| | | |
|---|---|---|
| KR | 1020110098627 | 9/2011 |
| KR | 1020120038947 | 4/2012 |
| KR | 1020120069619 | 6/2012 |
| KR | 1020120124603 | 11/2012 |
| KR | 1020130058850 | 6/2013 |
| KR | 1020130062581 | 6/2013 |
| KR | 1020150101930 | 9/2015 |

\* cited by examiner

DISPLAY DEVICE AND METHOD OF FABRICATING THE SAME

This application is a continuation of U.S. patent application Ser. No. 17/208,372, filed on Mar. 22, 2021, which is a is a continuation of U.S. patent application Ser. No. 16/775,002, filed on Jan. 28, 2020, which is a divisional of U.S. patent application Ser. No. 15/584,975, filed on May 2, 2017, which claims priority to Korean Patent Application No. 10-2016-0054763, filed on May 3, 2016, and all the benefits accruing therefrom under 35 U.S.C. § 119, the content of which in its entirety is herein incorporated by reference.

BACKGROUND

1. Field

Exemplary embodiments of the invention relate to a display device.

2. Description of the Related Art

A display device is classified into a liquid crystal display ("LCD"), an organic light-emitting diode ("OLED") display, a plasma display panel ("PDP"), an electrophoretic display, or the like according to how it emits light.

The display device generally includes a display panel for displaying an image. The display panel is provided by bonding upper and lower substrates having elements formed thereon for displaying an image so as to form a mother panel and then by cutting the mother panel to a desired cell size. The cutting of the mother panel may be performed by defining cutting grooves by a cutting wheel and by hitting the mother panel along the cutting grooves with a breaker.

However, in a process of separating the display panel of the desired size from the mother panel through the aforementioned cutting procedure, horizontal or vertical cracks may be generated on cut surfaces of the mother panel, and flaws such as plastic deformation may occur along the cutting grooves of the mother panel.

In order to remove or prevent any cracks or flaws in the mother panel, a method of cutting the mother panel by a cutting wheel having a shadow cut-in depth has been suggested. Also, in order to remove any cracks or flaws in the mother panel, a method of grinding the cut surfaces of the mother panel with a rough stone having a large granularity and a high hardness such as diamond may be used to remove cracks resulting from a cutting process.

SUMMARY

There is a clear limit in healing cracks with a method of cutting a mother panel by a cutting wheel having a shallow cut-in depth. In addition, a grinding method may increase a surface roughness of the mother panel and lower strength of the mother panel.

Exemplary embodiments of the invention provide a display device capable of preventing cracks on the sides of a panel.

Exemplary embodiments of the invention also provide a method of fabricating display device, which is capable of preventing cracks on the sides of a panel and involves grinding the panel so as to improve the strength of the panel.

However, exemplary embodiments of the invention are not restricted to those set forth herein. The above and other exemplary embodiments of the invention will become more apparent to one of ordinary skill in the art to which the invention pertains by referencing the detailed description of the invention given below.

According to an exemplary embodiment of the invention, a display device includes first and second substrates each including a short side and a long side, ground parts located on at least one of the sides of each of the first and second substrates and including at least one first ground surfaces, which are perpendicular to opposing surfaces of the first and second substrates, and at least one second ground surfaces, which are provided at at least one edge of the second substrate to define an obtuse angle with reference to the first ground surfaces, and unevenness disposed on the first ground surfaces along a first direction, where the unevenness defines an acute angle with reference to a normal line to the opposing surfaces.

In an exemplary embodiment, at least one of the short side and the long side may have curvature.

In an exemplary embodiment, the ground parts further include at least one second ground surfaces, which are provided at at least one edge of the first substrate to define an obtuse angle with reference to the first ground surfaces.

In an exemplary embodiment, the display device may further include a circuit board connected to the first or second substrate.

In an exemplary embodiment, the ground parts include the second ground surfaces at an edge of the second substrate facing the circuit board, but do not include any second ground surfaces at an edge of the first substrate facing the circuit board.

In an exemplary embodiment, the ground parts do not include any second ground surfaces at edges of the first and second substrates opposite to the edges of the first and second substrates facing the circuit board.

In an exemplary embodiment, the acute angle may be about 30° to about 80°.

In an exemplary embodiment; the unevenness may have a center line average roughness Ra of about 300 nm or less.

In an exemplary embodiment, the first or second substrate may include a sealing member, which is placed in contact with the first and second substrates.

According to an exemplary embodiment of the invention, a method of fabricating a display device includes providing a mother panel by bonding a second substrate onto a first substrate, separating a panel by cutting the mother panel along boundaries of a cell, allowing the panel to enter a grinder including a grinding part, which includes a grinding surface, and a shaft, which is connected to the grinding part, and grinding at least one cut surface of the panel by placing the at least one cut surface of the panel in contact with the grinder that is rotating, where a plane perpendicular to a rotation axis of the grinder defines a right angle with reference to opposing surfaces of the first and second substrates.

In an exemplary embodiment, the method may further include grinding the panel by placing at least one edge of the first substrate in contact with the grinding surface.

In an exemplary embodiment, the method may further include grinding the panel by placing at least one edge of the second substrate in contact with the grinding surface.

In an exemplary embodiment, during the grinding the panel, the rotation axis of the grinder may not fall on the same plane as those of the opposing surfaces.

In an exemplary embodiment, a diameter of the grinding part may be smaller than a length of sides of the panel.

In an exemplary embodiment, the method may further include bonding the first and second substrates by applying a sealant onto the first or second substrate.

According to the aforementioned and other exemplary embodiments of the invention, defects such as cracks that may be generated on the sides of a panel can be prevented, and the strength of the panel can be improved by uniformly and efficiently grinding the sides of the panel.

Other features and exemplary embodiments may be apparent from the following detailed description, the drawings, and the claims.

BRIEF DESCRIPTION OF THE DRAWINGS

The above and other exemplary embodiments and features of the invention will become more apparent by describing in detail exemplary embodiments thereof with reference to the attached drawings, in which.

DETAILED DESCRIPTION

Advantages and features of the invention and methods of accomplishing the same may be understood more readily by reference to the following detailed description of exemplary embodiments and the accompanying drawings. The invention may, however, be embodied in many different forms and should not be construed as being limited to the exemplary embodiments set forth herein. Rather, these exemplary embodiments are provided so that this invention will be thorough and complete and will fully convey the concept of the invention to those skilled in the art, and the invention will only be defined within the scope of the appended claims.

Spatially relative terms, such as "beneath", "below", "lower", "above", "upper", and the like, may be used herein for ease of description to describe one element or feature's relationship to another element(s) or feature(s) as illustrated in the drawings. It will be understood that the spatially relative terms are intended to encompass different orientations of the device in use or operation in addition to the orientation depicted in the drawings. For example, if the device in the drawings is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

It will be understood that when an element or layer is referred to as being "on", "connected to" or "coupled to" another element or layer, it can be directly on, connected or coupled to the other element or layer or intervening elements or layers may be present. Also, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention. "About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which the invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Figure 1:
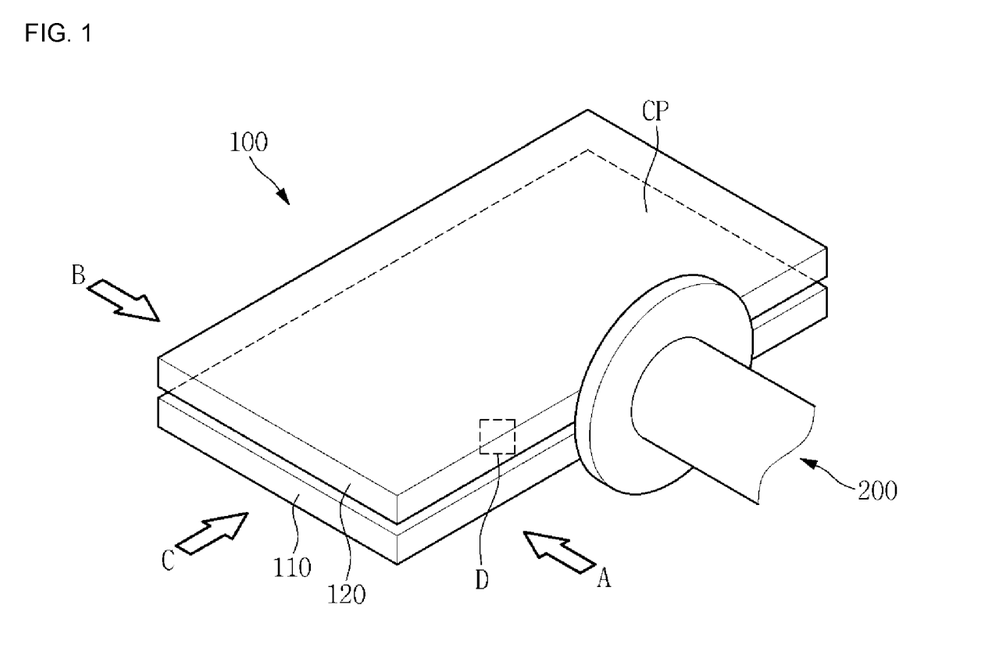
FIG. 1 is a perspective view illustrating an exemplary embodiment of the grinding of a side surface of a panel according to the invention.
Figure 2:
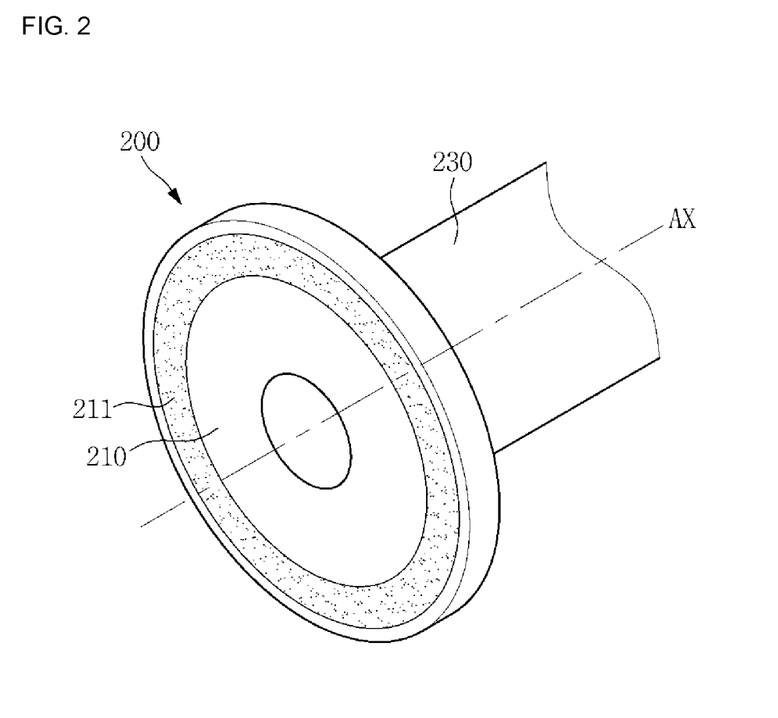
FIG. 2 is a perspective view illustrating an exemplary embodiment of a grinder according to the invention.

FIG. 1 is a perspective view illustrating the grinding of a side of a panel according to an exemplary embodiment of the invention, and FIG. 2 is a perspective view illustrating a grinder according to an exemplary embodiment of the invention.

Referring to FIG. 1, a panel 100 of a cell unit is provided by cutting a mother panel, which is obtained by bonding first and second substrates 110 and 120 together, and a grinding process is performed by moving the panel 100 over to a grinder 200, which is rotated at high speed about a rotation axis AX (refer to FIG. 2).

In order to sufficiently grind the sides of the panel 100, the panel 100 is moved at substantially low speed while rotating the grinder 200 at substantially high speed. The rotation speed of the grinder 200 and the moving speed of the panel 100 may be determined in consideration of an efficiency of grinding.

In a case where the rotation speed of the grinder 200 is about 1,000 revolutions per minute (rpm) or lower, the sides of the panel 100 may not be able to be sufficiently ground. In a case where the rotation speed of the grinder 200 exceeds about 10,000 rpm, the panel 100 may not be able to be uniformly ground because vibration is generated due to the high rotation speed of the grinder 200. Accordingly, in an exemplary embodiment, the rotation speed of the grinder 200 may be determined to be in the range of about 1,000 rpm to about 10,000 rpm, for example.

In an exemplary embodiment, the moving speed of the panel 100 may be in the range of about 0.1 meter per minute (m/min) to about 10 m/min, for example. In general, as the moving speed of the panel 100 decreases, the panel 100 can be ground more sufficiently and uniformly. However, in a case where the moving speed of the panel 100 is lower than 0.1 m/min, the grinding of the panel 100 may not be able to be properly controlled, and the yield of the panel 100 may decrease. In a case where the moving speed of the panel 100 exceeds about 10 m/min, the panel 100 may not be able to be sufficiently ground, and as a result, the efficiency of grinding the panel 100 may decrease, and defects may occur.

Given all the above, the rotation speed of the grinder 200 and the moving speed of the panel 100 may be determined in consideration of the efficiency and speed of grinding the panel 100.

Referring to FIG. 2, the grinder 200 includes a grinding part 210 and a shaft 230.

The grinding part 210 includes a grinding surface 211, which substantially performs a grinding process on a target object by directly contacting the target object. The diameter of the grinding part 210 may be smaller than the length of the sides of the panel 100.

The grinding part 210 is illustrated in FIG. 2 as including a ring-shaped grinding surface 211, but the invention is not limited thereto. That is, the grinding part 210 may include the grinding surface 211, which may have various shapes.

Although not specifically illustrated, a cylindrical groove may be defined in the center of the grinding part 210 of the grinder 200 to prevent an excessive load from being applied to the center of the grinding part 210 during grinding.

The grinding surface 211 may include a material obtained by mixing the combination of a healing agent and an abrasive with a binder.

In an exemplary embodiment, the binder may be polyurethane, for example. By using polyurethane as the binder, pores can be disposed on the grinding surface 211, and as a result, a soft-material grinding surface 211 can be obtained. Accordingly, in a case where the grinder 200 includes diamond or the like, a problem in which a rough cross section is obtained after grinding due to the high hardness of the grinder 200 can be addressed. In an exemplary embodiment, the binder including polyurethane may be included in an amount of, for example; about 30% by weight to about 50% by weight.

In an exemplary embodiment, cerium oxide ($CeO_2$) may be used as the healing agent for preventing defects such as cracks in the target object, for example. In an exemplary embodiment, in order to improve the grinding effect of the grinder 200, at least one of zirconium oxide ($ZrO_2$), silicon carbide (SiC), and aluminum oxide ($Al_2O_3$) may be used as the abrasive, for example. In an exemplary embodiment; the combination of the healing agent and the abrasive may include, for example, about 50% to about 60% by weight of the healing agent, i.e. $CeO_2$. $ZrO_2$, SiC, and $Al_2O_3$, which can be also used as abrasives, may be added in an amount of about 10 wt % or more, respectively.

Accordingly, the grinding surface 211 may include pores and may thus exhibit soft-material properties. Also, the grinding surface 211 can prevent cracks and can improve the grinding effect of the grinder 200.

The shaft 230 transmits rotational force to the grinding part 210 so that the grinding surface 211 can rotate at substantially high speed to perform grinding. Specifically, the shaft 230 is connected to an electric motor (not illustrated), which is driven by an external power source; and rotates at high speed to transmit rotational force to the grinding part 210.

The rotation axis AX of the shaft 230 is not located on the same plane as those of opposing surfaces CP of the first and second substrates 110 and 120 in order to prevent the panel 100 from being damaged by cracks after being ground. Rather, the rotation axis AX of the shaft 230 is disposed in parallel with the opposing surfaces CP. That is, a grinding process is performed by arranging the grinder 200 such that a target side surface of the panel 100 to be ground can be placed in contact with a lower portion of the grinding part 210 that is below the rotation axis AX. Accordingly, unevenness is provided in ground parts of the panel 100, which will be described later, along a first direction that is not perpendicular to the opposing surfaces CP. This will be described later in detail.

Figure 3A:
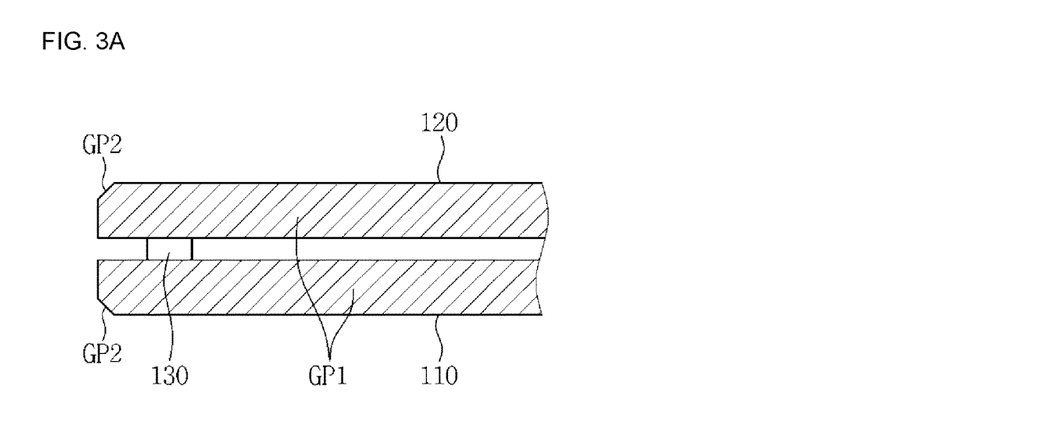
FIG. 3A is a side view of the panel of FIG. 1 as viewed from a direction A of FIG. 1.
Figure 3B:
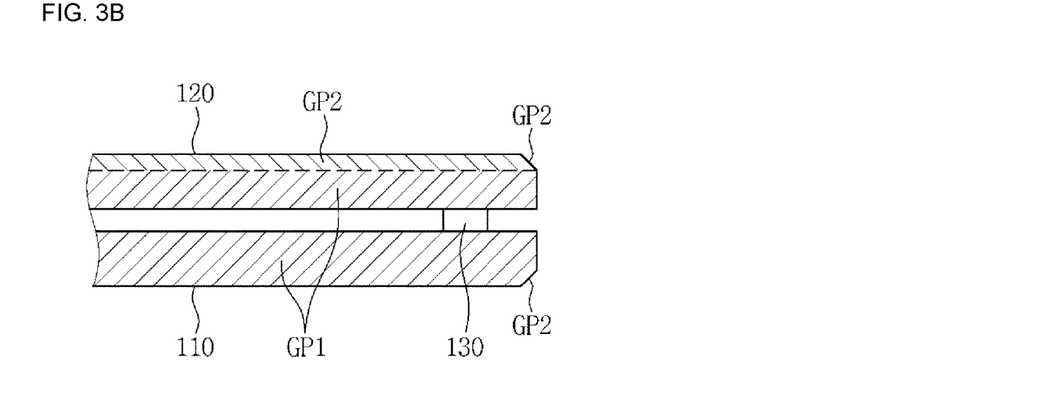
FIG. 3B is a side view of the panel of FIG. 1 as viewed from a direction B of FIG. 1.
Figure 3C:
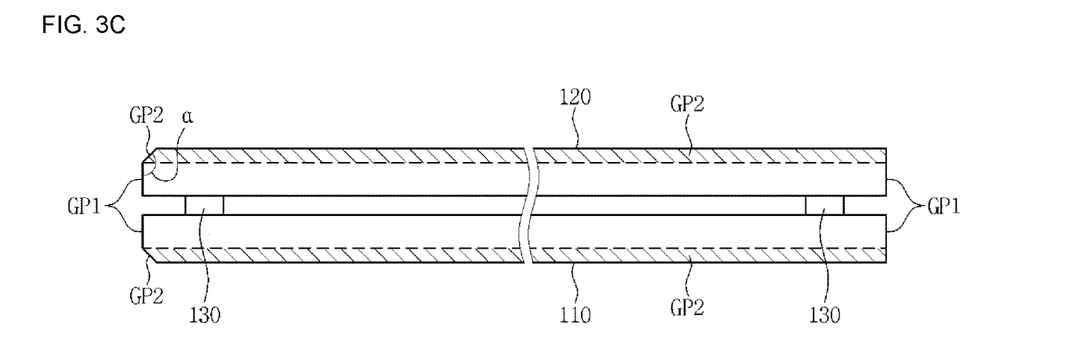
FIG. 3C is a side view of the panel of FIG. 1 as viewed from a direction C of FIG. 1.
Figure 4:
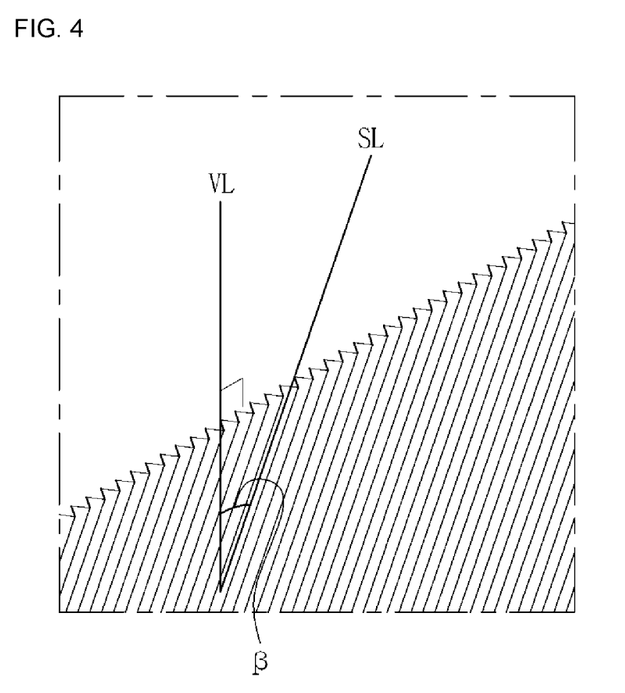
FIG. 4 is an enlarged perspective view of an area D of FIG. 1.

FIG. 3A is a side view of the panel of FIG. 1 as viewed from a direction A of FIG. 1, FIG. 3B is a side view of the panel of FIG. 1 as viewed from a direction B of FIG. 1, and FIG. 3C is a side view of the panel of FIG. 1 as viewed from a direction C of FIG. 1. FIG. 4 is an enlarged perspective view of an area D of FIG. 1.

Referring to FIGS. 1 through 4, the first and second substrates 110 and 120 are bonded by a sealing member 130, but the invention is not limited thereto. That is, in other exemplary embodiments, the first and second substrates 110 and 120 may be bonded by various methods other than using the sealing member 130.

The panel 100 may include ground parts on its side surface (hereinafter, referred to as "the first side surface") that can be viewed from the direction A of FIG. 1, its side surface (hereinafter, referred to as "the second side surface") that can be viewed from the direction B of FIG. 1, and its side surface (hereinafter, referred to as "the third side surface") that can be viewed from the direction C of FIG. 1. Although not specifically illustrated, the first or second substrate 110 or 120 of the panel 100 is connected to a circuit board for driving a display element.

Referring to FIG. 3A, the ground parts on the first side surface of the panel 100 include first ground surfaces GP1, which are disposed on the first side surface of the panel 100.

The first side surface of the panel 100 is placed in contact with, and ground by, the lower portion of the grinding part 210 that is below the rotation axis AX of the grinder 200, and as a result, unevenness is provided on the first ground surfaces GP1 along the first direction.

Specifically, referring to FIG. 4, unevenness is provided on the first ground surfaces GP1 to define a predetermined angle β with reference to a normal line VL to the opposing surfaces CP of the first and second substrates 110 and 120. That is, a straight line SL extending along the first direction defines an acute angle β with the normal line VL to the opposing surfaces CP. In an exemplary embodiment, the acute angle β may be, for example, about 30° to about 80°, for example.

In an exemplary embodiment, the unevenness provided on the first ground surfaces GP1 has a center line average roughness Ra of about 300 nm or less, for example. In an exemplary embodiment, the center line average roughness Ra may be about 200 nanometers (nm) to about 300 nm.

Accordingly, the strength of the panel 100 can be improved, and damage that may be caused to the panel 100 by defects such as cracks can be prevented. This is more apparent in a curved display device, which is highly susceptible to damage that may be caused to the panel 100 by cracks.

Referring to FIG. 3B, the ground parts on the second side surface of the panel 100 include first ground surfaces GP1 and a second ground surface GP2. A terminal part (not illustrated) of the panel 100 is connected to the circuit board through the second side surface of the panel 100, and a flexible connector may be used to connect the terminal part to the circuit board.

The first ground surfaces GP1 on the second side surface of the panel 100, like the first ground surfaces GP1 on the first side surface of the panel 100, have unevenness provided along the first direction. Accordingly, the strength of the panel 100 can be improved, and damage that may be caused to the panel 100 by defects such as cracks can be prevented The second ground surface GP2 is disposed on the second side surface of the panel 100 along an edge of the second substrate 120 and defines an obtuse angle α (refer to FIG. 3C) with the first ground surfaces GP1 on the second side surface of the panel 100. In an exemplary embodiment, the obtuse angle α may be, for example, about 80° to about 170°, for example.

Accordingly, the panel 100 can be prevented from being damaged by any cracks on the second side surface of the panel 100. Also, by providing the second ground surface GP2 on the second side surface of the panel 100, the flexible connector can be prevented from being damaged by a sharp edge of the panel 100, The second ground surface GP2 is illustrated in FIG. 3B as being disposed only on a side surface of the second substrate 120 corresponding to the second side surface of the panel 100, but the invention is not limited thereto. That is, in an alternative exemplary embodiment, the second ground surface GP2 may also be provided on a side surface of the first substrate 110 corresponding to the second side surface of the panel 100.

Referring to FIG. 3C, the ground parts of the third side surface of the panel 100 include second ground surfaces GP2, which are provided on edges of the first and second substrates 110 and 120.

Accordingly, the panel 100 can be prevented from being damaged by any cracks on the third side surface of the panel 100.

A display device according to an exemplary embodiment of the invention and a method of fabricating a display device according to an exemplary embodiment of the invention will hereinafter be described with reference to FIGS. 5A through 5D. FIGS. 5A through 5D are views illustrating a method of fabricating a display device according to an exemplary embodiment of the invention. In the description that follows, it is assumed that the display device according to the illustrated exemplary embodiment is a liquid crystal display ("LCD").

Figure 5A:
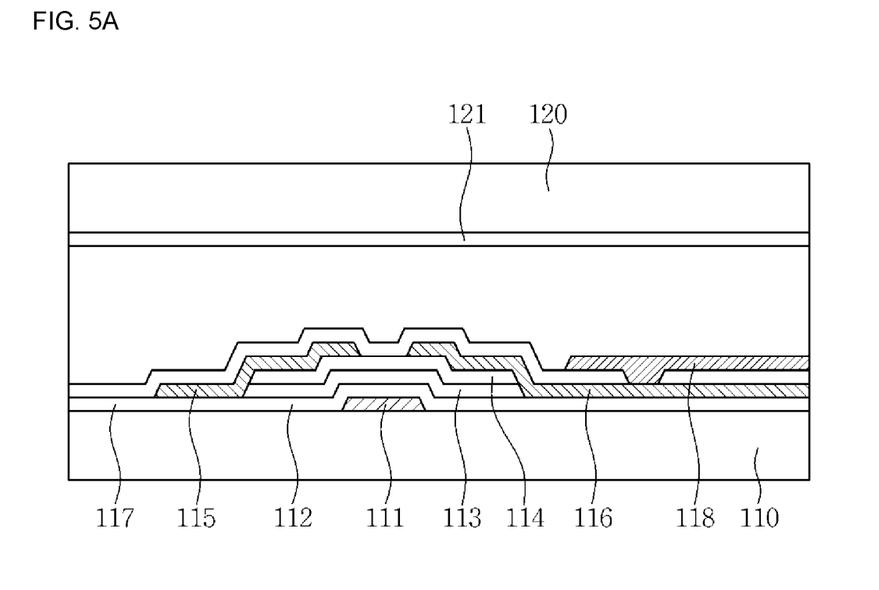
FIGS. 5A through 5D are views illustrating an exemplary embodiment of a method of fabricating a display device according to the invention.

The display device according to the illustrated exemplary embodiment includes the first substrate 110 on which a thin-film transistor ("TFT") is disposed, the second substrate 120 on which a color filter ("CF") is disposed, and a liquid crystal layer (not illustrated) which is interposed between the first and second substrates 110 and 120. In an exemplary embodiment, the CF may be disposed on the first substrate 110. However, the invention is not limited thereto, and the CF may be disposed on the second substrate 120.

FIG. 5A illustrates a part of a display region of the first and second substrates 110 and 120. Referring to FIG. 5A, a gate electrode 111 is disposed on the first substrate 110. In an exemplary embodiment, the first substrate 110 may be a transparent insulating substrate including glass, and the gate electrode 111 is provided by patterning a metal layer, for example.

A gate insulating film 112, a semiconductor layer 113, and an ohmic contact layer 114 are sequentially disposed on the first substrate 110 and on the gate electrode 111. In an exemplary embodiment, the gate insulating film 112 may include an inorganic insulating material such as silicon nitride (SiNx) or silicon oxide (SiO$_2$). The semiconductor layer 113 and the ohmic contact layer 114 may both have a stack structure.

A source electrode 115 and a drain electrode 116 are disposed on the ohmic contact layer 114, and a passivation film 117 is disposed on the source electrode 115 and on the drain electrode 116. Each of the source electrode 115 and the drain electrode 116 is provided by patterning a metal layer. In an exemplary embodiment, the passivation film 117 may include an inorganic insulating material such as SiNx or SiO$_2$ or an organic insulating material such as an acrylic resin or benzocyclobutene ("BCB").

Thereafter, the passivation film 117 is etched to expose the drain electrode 116, and a conductive layer on the passivation film 117 is patterned, thereby providing a pixel electrode 118 to be in contact with the drain electrode 116.

The CF (not illustrated) and a common electrode 121, which is for applying a voltage to the second substrate 120, are disposed on the second substrate 120. In an exemplary embodiment, the second substrate 120 may be a transparent insulating substrate including glass, for example. In an exemplary embodiment, the common electrode 121 may include a transparent conductive material such as indium tin oxide ("ITO") or indium zinc oxide ("IZO"), for example. In an exemplary embodiment, the ITO may be a polycrystalline or monocrystalline material, and the IZO may also be a polycrystalline or monocrystalline material, for example.

Although not specifically illustrated, each of the first and second substrates 110 and 120 may include a light-blocking part, which includes a black pigment.

After the preparation of the first and second substrates 110 and 120, a sealant is applied on a non-display region on the outside of the display region of the second substrate 120, and the first and second substrates 110 and 120 are bonded together to provide a mother panel. Thereafter, a sealing member 130 is provided by curing the sealant through ultraviolet ("UV") exposure, and a liquid crystal material is injected between the first and second substrates 110 and 120.

The above-mentioned structure of the panel 100 is merely exemplary, and the invention is not limited thereto. That is, the invention is also applicable to various types of panels other than that set forth herein. Also, the panel 100 has been described to include an LCD panel as an example, but the invention is not limited to an LCD panel, That is, the panel 100 may also be applicable to various other types of the display device such as an organic fight-emitting diode ("OLED") panel.

Figure 5B:
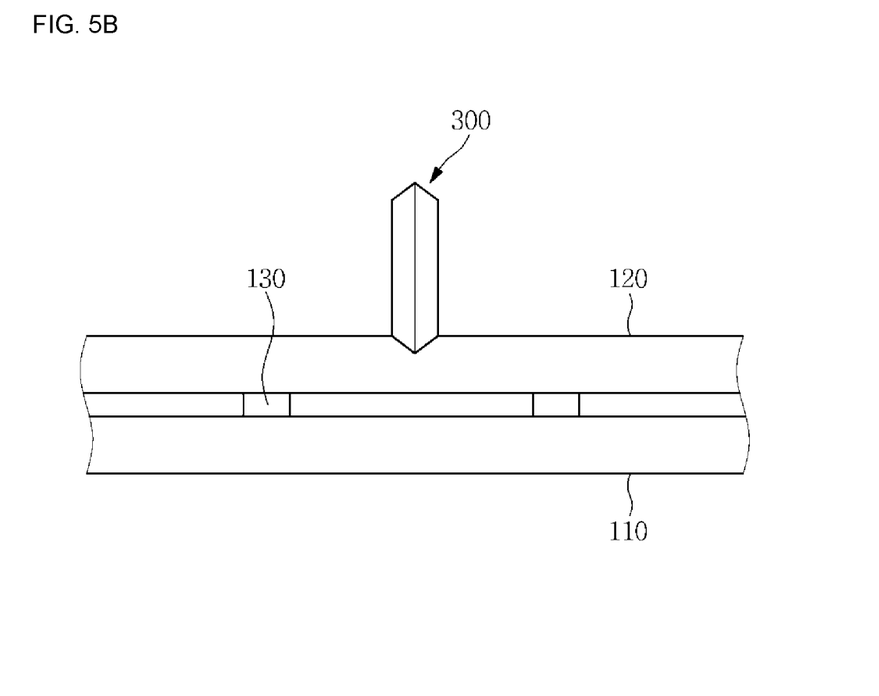

Referring to FIG. 58, cutting grooves are defined in the mother panel along the boundaries of a cell using a cutting wheel 300, and the panel 100 (refer to FIG. 1) is separated by hitting the mother panel along the cutting grooves. The cutting grooves may be defined in at least one of the first and second substrates 110 and 120. The sealing member 130 may be provided near the boundaries of the cell, but may also be provided to overlap with the boundaries of the cell to extend over to a neighboring cell, in which case, the separation of the panel 100 from the mother panel is performed by cutting the top of the sealing member 130 to define cutting grooves and hitting the mother panel along the cutting grooves.

A large number of defects such as cracks may be provided on the edges of the panel 100 after the hitting of the mother panel along the cutting grooves to separate the panel 100. Since the separation of the panel 100 is performed by defining cutting grooves on the first and second substrates 110 and 120 with the cutting wheel 300 and hitting the first and second substrates 110 and 120 along the cutting grooves, inner edges of the first and second substrates 110 and 120 that are not in contact with the cutting wheel 300 may become substantially perpendicular to the top and bottom surfaces of the panel 100. Accordingly, defects such as cracks are not provided on the inner edges of the cut surfaces of the first and second substrates 110 and 120, and as a result, an additional grinding process is not performed.

A grinding process is needed for the outer edges of the cut surfaces of the first and second substrates 110 and 120 to remove defects such as cracks and to improve rigidity. Thus, after the cutting of the mother panel to separate the panel 100, the outer edges of the cut surfaces of the first and second substrates 110 and 120 are ground using the grinder 200. Specifically, outer edges of the cut surfaces of the first and second substrates 110 and 120 that are highly susceptible to defects such as cracks, for example, one to eight outer edges, can be selectively ground. In the illustrated exemplary embodiment, all the outer edges of the cut surfaces of the first and second substrates 110 and 120 except for those on the first side surface of the panel 100, i.e., a total of six outer edges, may be ground.

The outer edges of each of the first and second substrates 110 and 120 may be ground at the same time. That is, by using multiple grinders 200 disposed above or below the panel 100, the edges of each of the first and second substrates 110 and 120 may be ground at the same time, but the invention is not limited thereto. That is, various methods may be used to grind the edges of the panel 100 depending on the size of the panel 100 and other grinding conditions.

Figure 5C:
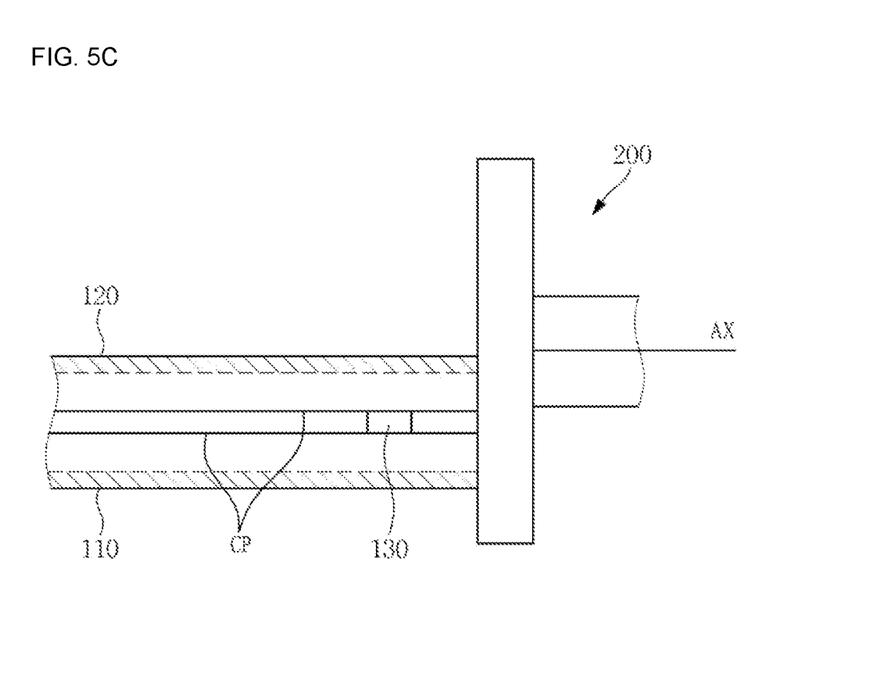
Figure 5D:
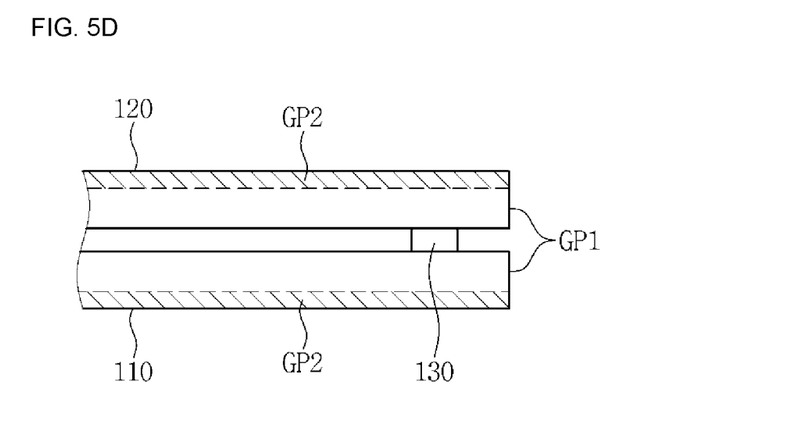

Referring to FIGS. 5C and 5D, which illustrate the grinding of the first side surface of the panel 100, the first side surface of the panel 100 may be ground in a direction perpendicular to the opposing surfaces CP of the first and second substrates 110 and 120 using the grinder 200, instead of grinding the edges of the cut surfaces of the first and second substrates 110 and 120. That is, first ground surfaces GP1 are provided on the first side surface of the panel 100 along the direction perpendicular to the opposing surfaces CP of the first and second substrates 110 and 120. The grinder 200 of FIGS. 1 through 4 is used to provide the first ground surfaces GP1.

The first side surface of the panel 100 is placed in contact with, and ground by, the lower portion of the grinding part 210 that is below the rotation axis AX of the grinder 200, and as a result, unevenness is provided on the first ground surfaces GP1 along the first direction.

Specifically, unevenness is provided on the first ground surfaces GP1 to define a predetermined angle β with reference to a normal line VL to the opposing surfaces CP of the first and second substrates 110 and 120. That is, a straight line SL extending along the first direction defines an acute angle β with the normal line VL to the opposing surfaces CP. In an exemplary embodiment, the acute angle β may be, for example, about 30° to about 80°, for example.

In an exemplary embodiment, the unevenness provided on the first ground surfaces GP1 has a center line average roughness Ra of about 300 nm or less, for example. In an exemplary embodiment, the center line average roughness Ra may be about 200 nm to about 300 nm, for example.

As mentioned above, the panel 100 is ground using the grinder 200 and is coupled to a circuit board, a backlight assembly, and a mold frame accommodating the circuit board and the backlight assembly, thereby obtaining the display device according to the illustrated exemplary embodiment.

The method of fabricating a display device according to the illustrated exemplary embodiment can remove defects such as cracks by grinding the side surfaces of the panel 100 with the grinder 200, and can improve the strength of the panel 100 by providing unevenness on the panel 100 along the first direction.

In addition, a curved display device or a mid- or small-size display device having a relatively thin panel is highly susceptible to defects such as cracks, and thus; its panel is highly likely to be damaged. These problems can be addressed by applying the panel 100.

Figure 6A:
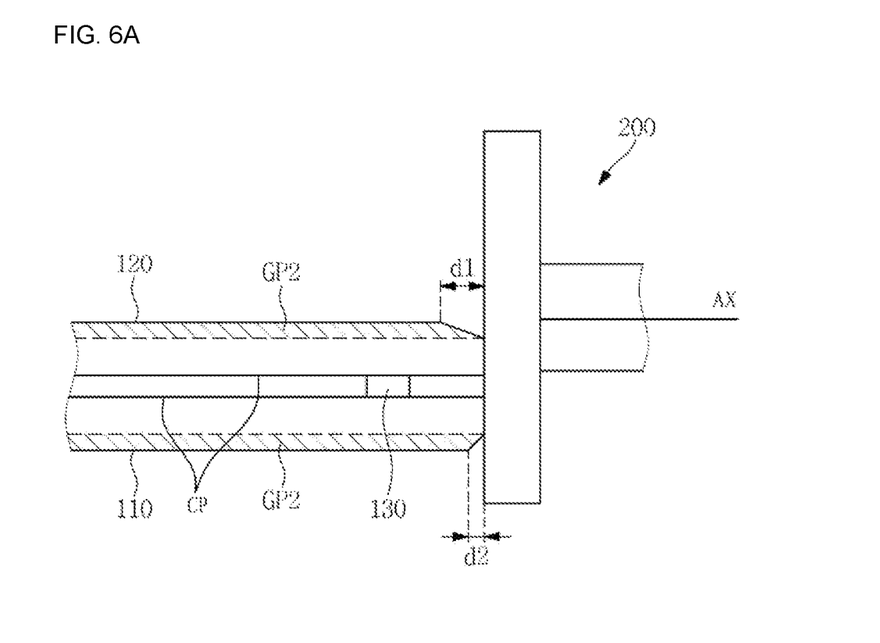
FIGS. 6A and 6B are side views illustrating an exemplary embodiment of a grinding process according to the invention.
Figure 6B:
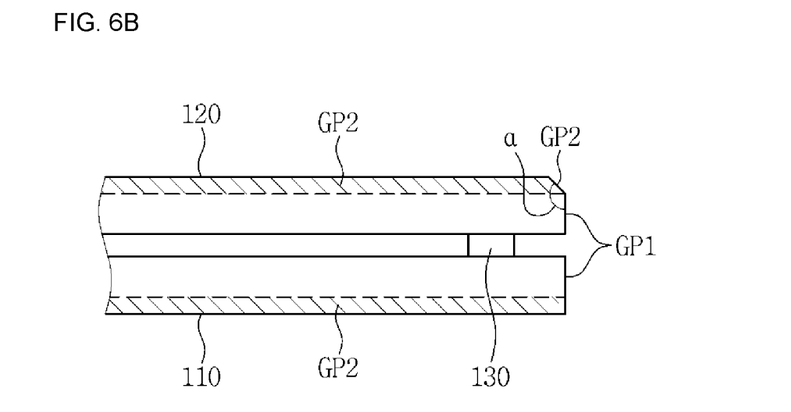

FIGS. 6A and 6B are side views illustrating a grinding process according to an exemplary embodiment of the invention.

Specifically, FIGS. 6A and 6B illustrate the grinding of the second side surface of the panel 100. Referring to FIGS. 6A and 6B, edges of the cut surfaces of the first and second substrates 110 and 120 on the second side surface of the panel 100 are ground first.

Specifically, edges of the second side surfaces of the first and second substrates 110 and 120 are ground to have different ground areas. That is, a ground width d1 at the top of the second substrate 120 may be greater than a ground width d2 at the bottom of the first substrate 110. In an exemplary embodiment, the ground width d1 may be about 400 micrometers (um) to about 500 um, and the ground width d2 may be about 80 um to about 150 um, for example.

The outer edges of each of the first and second substrates 110 and 120 may be ground at the same time. That is, the edges of each of the first and second substrates 110 and 120 may be simultaneously ground using multiple grinders 200 disposed above and below, respectively, the second side surface of the panel 100, but the grinding of the panel 100 is not limited thereto. That is, the grinding of the panel 100 may vary depending on the size of the panel 100 and other grinding conditions.

Edges of the cut surfaces of the first and second substrates 110 and 120 are ground first, and then the second side surface of the panel 100 is ground using the grinder 200 to be perpendicular to the opposing surfaces CP of the first and second substrates 110 and 120. That is, a first ground surface GP1 is provided on a part of the side surface of the second substrate 120 corresponding to the second side surface of the panel 100 to be perpendicular to the opposing surfaces CP of the first and second substrates 110 and 120. Also, the ground surface at the bottom edge of the first substrate 110 is removed, and another first ground surface GP1 (refer to FIGS. 3A and 3B) is provided on the entire side surface of the first substrate 110 corresponding to the second side surface of the panel 100 to be perpendicular to the opposing surfaces CP of the first and second substrates 110 and 120, The grinder 200 of FIGS. 1 through 4 may be used to grind the second side surface of the panel 100.

The ground surface at the bottom edge of the first substrate 110 may be completely removed during the grinding of the second side surface of the panel 100, but the invention is not limited thereto. That is, a second ground surface GP2 may be disposed on the bottom edge of the first substrate 110 after the grinding of the second side surface of the panel 100.

The second side surface of the panel 100 is ground by being placed in contact with the lower portion of the grinding part 210 that is below the rotation axis AX of the grinder 200, and as a result, unevenness is provided on the first ground surfaces GP1 along the first direction.

The unevenness provided on the first ground surfaces GP1 defines a predetermined angle β with reference to a normal line VL (refer to FIG. 4) to the opposing surfaces CP of the first and second substrates 110 and 120. That is, a straight line SL (refer to FIG. 4) extending along the first direction defines an acute angle β with the normal line VL to the opposing surfaces CP. In an exemplary embodiment, the acute angle β may be, for example, about 30° to about 80°, for example.

In an exemplary embodiment, the unevenness provided on the first ground surfaces GP1 has a center line average roughness Ra of about 300 nm or less, for example. In an exemplary embodiment, the center line average roughness Ra may be about 200 nm to about 300 nm, for example.

The method of fabricating a display device according to the illustrated exemplary embodiment can remove defects such as cracks by grinding the side surfaces of the panel 100 with the grinder 200, and can improve the strength of the panel 100 by providing unevenness on the panel 100 along the first direction.

In addition, a curved display device or a mid- or small-size display device having a relatively thin panel is highly susceptible to defects such as cracks, and thus, its panel is highly likely to be damaged. These problems can be addressed by applying the panel 100.

While exemplary embodiments are described above, it is not intended that these embodiments describe all possible modifications of the invention. Rather, the words used in the specification are words of description rather than limitation, and it is understood that various changes may be made without departing from the spirit and scope of the invention. Additionally, the features of various implementing embodiments may be combined to provide further exemplary embodiments of the invention.

What is claimed is:

1. A display device, comprising:
   first and second substrates facing each other to define opposing surfaces, each of the first and second substrates including a first side surface and a second side surface; and
   a ground part located on the first side surface of the first substrate or on the first side surface of the second substrate and including at least one first ground surface, which is perpendicular to the opposing surfaces,
   wherein the at least one first ground surface has a plurality of grooves,
   wherein each of the plurality of grooves is substantially extended in a first direction which defines a first angle with reference to a normal line to the opposing surfaces, and
   wherein the first angle is an acute angle.

2. The display device of claim 1, wherein the at least one first ground surface does not have any groove extended in a second direction which intersects the first direction.

3. The display device of claim 1,
   wherein the ground part further includes at least one second ground surface, which is tilted from the at least one first ground surface at a second angle.

4. The display device of claim 3, wherein the first side surface of the first substrate or the first side surface of the second substrate includes the at least one first ground surface and does not include the at least one second ground surface.

5. The display device of claim 3, wherein the ground part is further located on the second side surface of the first substrate or the second side surface of the second substrate.

6. The display device of claim 5, wherein the at least one second ground surface is located at a top of the second side surface of the second substrate or at a bottom of the second side surface of the first substrate.

7. The display device of claim 3, wherein the second angle is about 80 degrees to about 170 degrees.

8. The display device of claim 3, wherein:
   each of the first and second substrates further includes a third side surface opposite to the first side surface,
   the ground part is further located on the third side surface of the first substrate or the third side surface of the second substrate, and
   the third side surface of the first substrate or the third side surface of the second substrate includes both the at least one first ground surface and the at least one second ground surface.

9. The display device of claim 8, wherein the first side surface of the first substrate or the first side surface of the second substrate includes the at least one first ground surface and does not include the at least one second ground surface.

10. The display device of claim 9, wherein the at least one second ground surface is located at the top of the third side surface of the second substrate and the bottom of the third side surface of the first substrate, respectively.

11. The display device of claim 1, wherein the first angle is about 30 degrees to about 80 degrees.

* * * * *